UNITED STATES PATENT OFFICE.

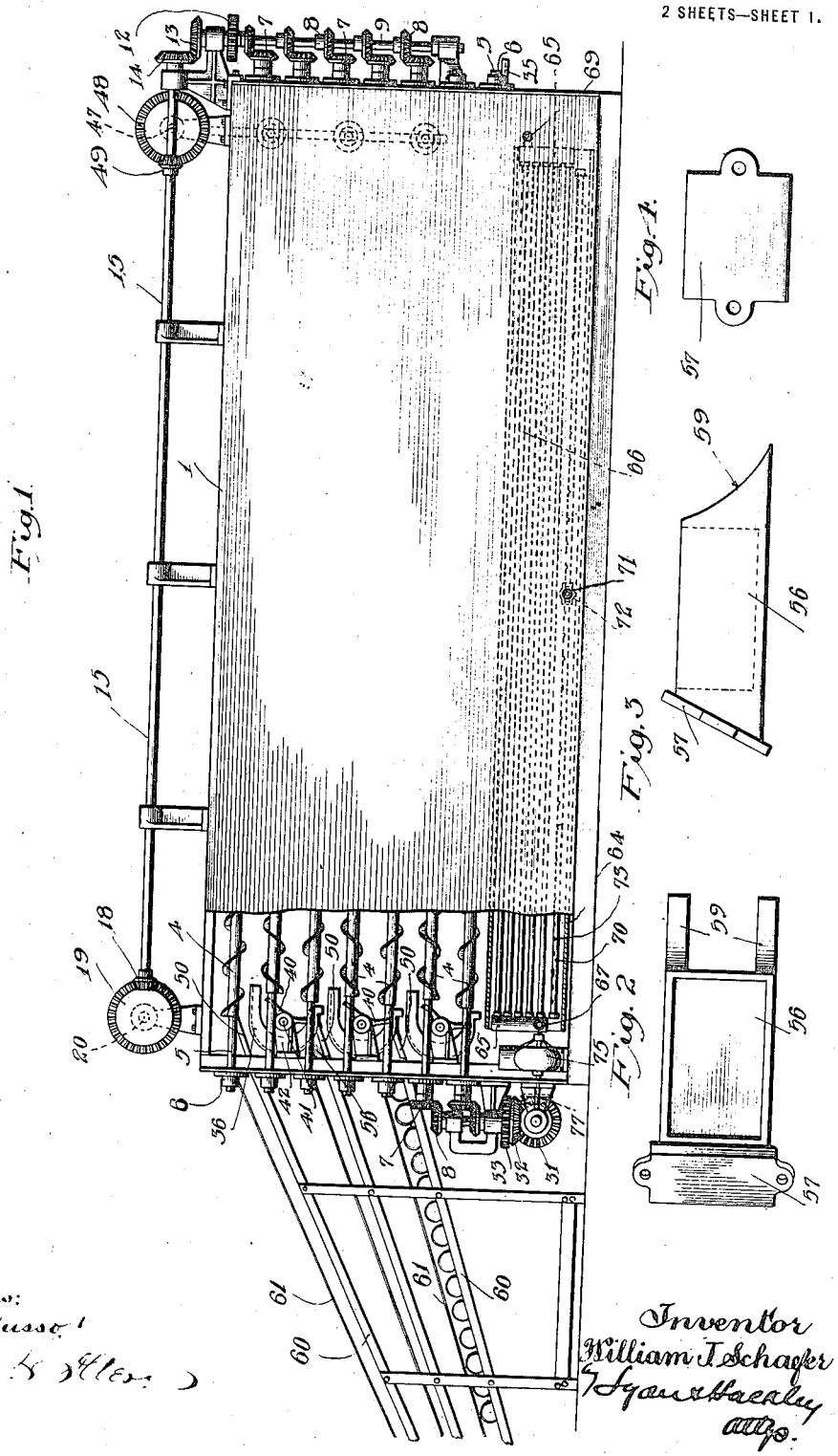

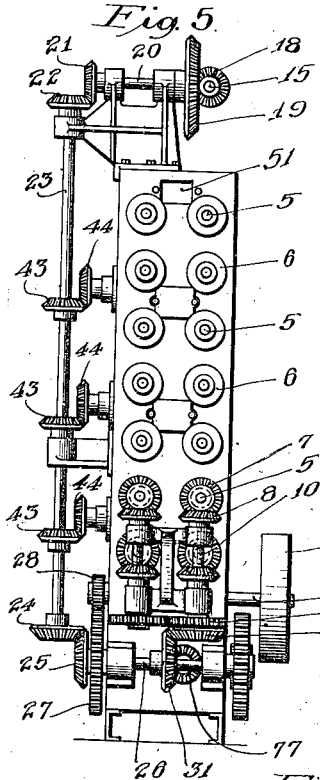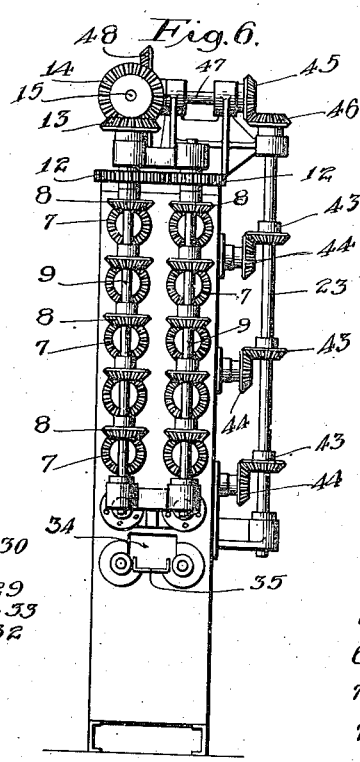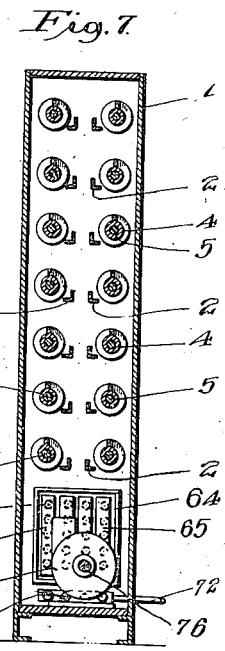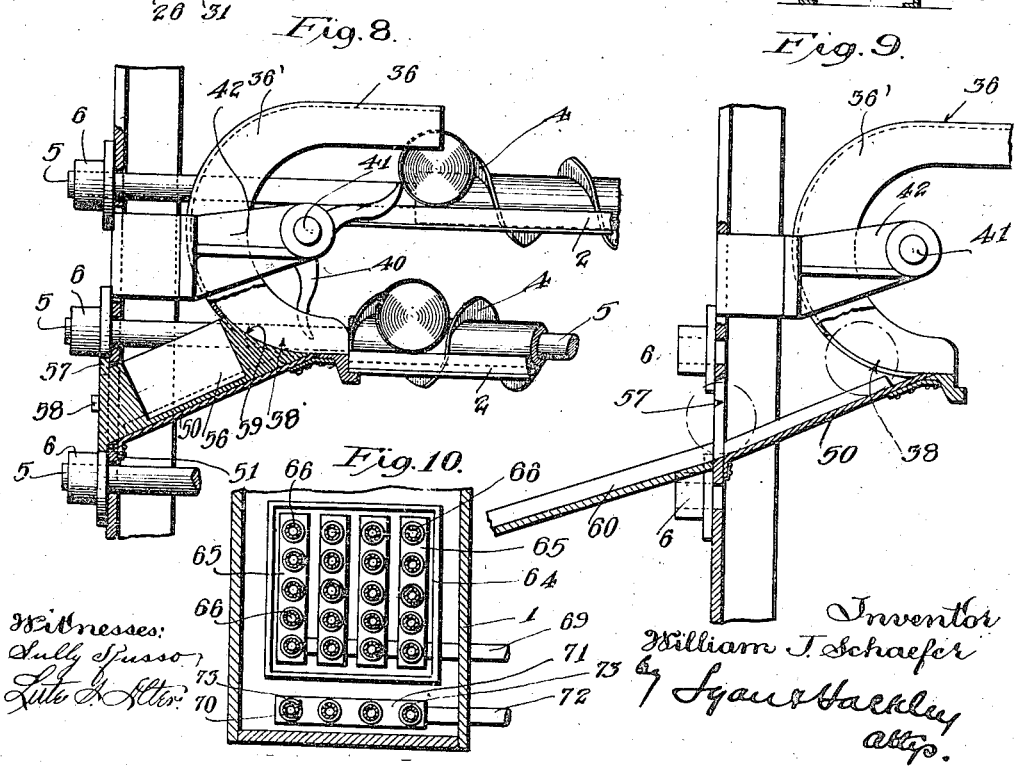

WILLIAM J. SCHAEFER, OF ONTARIO, CALIFORNIA.

COOKER.

1,195,507.  Specification of Letters Patent.  Patented Aug. 22, 1916.

Application filed July 29, 1913. Serial No. 781,779.

*To all whom it may concern:*

Be it known that I, WILLIAM J. SCHAEFER, a citizen of the United States, residing at Ontario, in the county of San Bernardino and State of California, have invented a new and useful Cooker, of which the following is a specification.

This invention relates to improvements in apparatus for cooking fruit or other food materials contained in cans, and particularly improvements on the agitating cooker disclosed in Patent No. 1,044,822, granted to me November 19, 1912.

One object of the invention is to provide means for delivering the cans from the cooker at different points so as to change, when desired, the length of time the cans will remain in the cooker.

Another object of the invention is to provide improved means for maintaining a uniform high temperature in the cooker.

Other objects of the invention will appear hereinafter.

The accompanying drawings illustrate an embodiment of my invention, and referring thereto: Figure 1 is a side elevation of the cooker partly broken away. Fig. 2 is a plan view of one of the plug devices for closing the discharge openings from the cooker. Fig. 3 is a side elevation of such plug device. Fig. 4 is an end elevation thereof. Fig. 5 is an end elevation of the cooker at the discharge end thereof. Fig. 6 is an end elevation at the receiving end thereof. Fig. 7 is a vertical section on line $x^7$—$x^7$, Fig. 1. Fig. 8 is a vertical section partly in elevation, of the discharge and transfer means for the conveying devices in the cooker, showing one of the closure plugs in place. Fig. 9 is a vertical section, partly in elevation, of the discharge means, the closure plug being removed. Fig. 10 is a vertical section of the heating means.

The cooker comprises a casing or shell 1 of sheet metal or other suitable material having side walls, end walls, and top and bottom plates forming a substantially rectangular box. Horizontal track rails 2 extend longitudinally within the casing from end to end thereof forming supports upon which the cans roll as explained in my patent aforesaid, such rolling of the cans on said tracks being effected by feed screws consisting of helical ribs 4 on shafts 5 extending longitudinally within the casing at either side of the track rails 2 and mounted in bearings 6 on the end plates of the casing. The shafts 5 of each pair are rotated in opposite directions by suitable means, for example, by a bevel gear 7 at one end of each shaft engaged by a bevel gear 8 on a vertically extending shaft 9 at the rear end of the machine, in the case of the upper shafts 5, or on a vertical shaft 10 at the discharge end of the machine in the case of the lower shafts 5. The shafts 9 are connected by gears 12 so as to rotate in opposite directions and one of the shafts 9 carries a bevel gear 13 engaging with a bevel gear 14 on a shaft 15, extending longitudinally of the casing and provided at its other end with a bevel gear 18 engaging with a bevel gear 19 on a shaft 20. A bevel gear 21 on shaft 20 engages with a bevel gear 22 on a vertical shaft 23, provided at its lower end with a bevel gear 24 engaging with a bevel gear 25 on a shaft 26. Said shaft 26 is provided with a gear 27 engaged by a pinion 28 on the driving shaft 29, which is provided with suitable operating means, for example, a pulley 30 for receiving the power to drive the machine. A bevel gear 31 on shaft 26 engages with a bevel gear 32 on one of the vertical shafts 10 aforesaid, said shafts 10 being connected by gear wheels 33, so as to rotate in opposite directions.

A feed opening 34 is provided in one end of casing 1, a track 35 being provided at this opening for leading the cans onto the lowermost pair of rails 2. The feed screws on the shafts 5, except at this feeding point, terminate a short distance from the end walls of the casing 1, and transfer means are provided at each end of the casing for transferring the cans from each track 2 to the next higher track, these transfer means being located in alternation at opposite ends of the casing so that the cans are caused to travel progressively from the lowermost to the uppermost track. Each transfer means may comprise a guideway or curved track consisting of a U-shaped member 36 and having side walls 36' for retaining the can thereon, the lower branch of said U-shaped member extending in substantial continuity with the upper edges of a pair of track rails 2, and the upper branch of said U member extending somewhat above the next higher pair of track rails 2 so as to enable the can to be discharged from the lower track rails on to said curved guide, and to be delivered from said guide on to the next higher pair of track rails 2. The transfer mechanism also includes rotary means formed as arms 40 on the shaft 41 journaled in a bracket 42, said arms 40 moving within the curved guide 36 so as to push the cans from the lower to the upper rails. The shafts 41 are provided with bevel gears 44 engaged by bevel gears 43 on the shaft 23 aforesaid at one end of the machine and on a similar shaft 23 at the other end of the machine, said second shaft 23 being driven through bevel gears 45 and 46 from a shaft 47 which is driven through bevel gears 48 and 49 from the longitudinal shaft 15.

The uppermost pair of track rails 2, at the delivery end thereof, are not provided with any transfer mechanism, but are provided with a discharge chute consisting of a plate 50 secured to the end of said rails and extending to a discharge opening 51 in the delivery end of the casing 1. Similar delivery openings 51 are provided at intermediate points below the aforesaid delivery opening 51 for the discharge of the cans at such intermediate points, and a discharge chute or plate 50 extends obliquely upward from each discharge opening 51 to a pair of track rails 2. The curved guides 36 are located adjacent to these intermediate discharge chutes and have discharge openings 38 through which the cans may roll. Plugs 56 are provided for closing said discharge openings 38 when required, said plugs consisting of members adapted to extend through the said openings 51 and provided with plates 57 at their outer ends adapted to rest against the end walls of the casing 1 and to be clamped thereto by bolts 58 and said plugs being formed at their inner ends with guide portions 59 adapted to extend within the opening 38 aforesaid in the curved guides 36 and to form curved guide surfaces continuous with the guides 36 so that when the plug is in place, the portions 59 form parts of the curved guide on track 36 and the cans will roll on the guide portions 59 and 36 continuously from the lower to the upper track rail. From the discharge openings 51, chutes or delivery tracks 60 extend obliquely downward to any suitable receiving means and braking means consisting of flexible strips 61 of cloth or other suitable material may be provided over these discharge chutes to retard the movement of the cans in rolling down the same. These discharge chutes may all converge to a common point of delivery.

In the lower part of the casing 1 is provided means for supplying heat to the casing, said means being preferably adapted to produce a continuous circulation of the heating medium in the casing, so as to obtain greater uniformity of distribution of high temperature therein. For this purpose a trunk or elongated box 64 is provided in the lower part of the casing extending nearly from end to end thereof, but opening at each end into the interior of the casing. Manifolds 65 are provided at each end of this trunk and steam heating pipes 66 are connected to said manifolds and extend longitudinally within the trunk, the manifolds 65 at one end being connected together and to a steam supply pipe 67 and the manifolds 65 at the other end being connected together and to an exhaust or drainage pipe 69. Means are also preferably provided for supplying steam to the interior of the trunk 64, said means consisting, for example, of pipes 70 connected to a manifold 71 having a supply connection 72, said pipes 70 being perforated as shown at 73, to permit escape of steam into the trunk 64. At one end of the trunk 64 a blower 75 is provided, adapted to draw the air from the trunk 64 and to force it upwardly into the interior of the casing 1. The shaft 76 of said blower is operated in any suitable manner, for example, by a bevel wheel 31 on the shaft 26 engaging with a bevel wheel 77 on the blower shaft 76.

The operation is as follows: The cans are supplied to the inlet opening 34 by any suitable means and caused to roll along the track rails 2 by the action of the screw feed means 4, as in my patent aforesaid. As each can reaches the end of the track rail it is pushed up by the rotating means 40 onto the next higher track rails, on which it is propelled in the opposite direction by the screw feed means 4, the screw feed means for alternate track rails being reversely pitched, so as to provide for such reverse motion. As soon as the can reaches a discharge chute 50 and space 51 which is unobstructed, it is discharged through such space. During this passage of the cans through the casing in this manner they are heated by the hot air and steam circulated through the casing from the trunk 64 by the blower 75, the air and steam being drawn in at one end of the trunk and out at the other end and forced upwardly into the interior of the casing. When maximum time of heating is required, the plugs 56 are placed in the lower openings 51, so that the cans are guided past said openings by the guides 59. But when a lesser time of heating is required, one of the plugs 56 is removed to allow the cans to be discharged from the cooker before they reach the upper tracks.

What I claim is:

1. A cooker comprising a casing, means for feeding cans therethrough at a plurality of levels, and means for transferring cans from one level to another, said casing being provided with a plurality of outlets for discharging the cans at different levels, and means for closing or opening said outlets.

2. A cooker comprising a casing, longitudinal tracks therein, means for propelling cans along said tracks, curved guides extending from the delivery end of each track, to guide the cans to the next track, rotary means for pushing the cans along said curved guides, said casing having outlets for the cans at different levels, and means for plugging the lower outlet, comprising a member movably mounted at said outlet and provided with guide portions forming a part of one of said curved guides.

3. A cooker comprising a casing provided with an inlet and with a plurality of outlets at different levels, a track extending within the casing and adapted to receive cans at said inlet, tracks located above said first named track, at different levels, discharge chutes leading from certain of said tracks to said outlets, transfer means for transferring cans, and means for obstructing the passage of cans from said chutes, said obstructing means being movable to permit discharge of the cans.

In testimony whereof, I have hereunto set my hand at Ontario, California, this 23 day of July, 1913.

WILLIAM J. SCHAEFER.

In presence of—
GEORGE T. HACKLEY,
LORA M. BOWERS.